(12) United States Patent
Ohno et al.

(10) Patent No.: US 11,803,094 B2
(45) Date of Patent: Oct. 31, 2023

(54) OPTICAL ELEMENT ASSEMBLY, OPTICAL IMAGING DEVICE, AND OPTICAL PROCESSING DEVICE

(71) Applicant: KABUSHIKI KAISHA TOSHIBA, Tokyo (JP)

(72) Inventors: Hiroshi Ohno, Tokyo (JP); Takashi Usui, Saitama Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 280 days.

(21) Appl. No.: 16/802,828

(22) Filed: Feb. 27, 2020

(65) Prior Publication Data

US 2021/0080801 A1 Mar. 18, 2021

(30) Foreign Application Priority Data

Sep. 18, 2019 (JP) .................................. 2019-168955

(51) Int. Cl.
*G02F 1/29* (2006.01)

(52) U.S. Cl.
CPC ............ *G02F 1/29* (2013.01); *G02F 2203/28* (2013.01)

(58) Field of Classification Search
CPC .... G02F 1/167; G02F 1/29; G02F 2001/1678; G02F 1/292; G02F 1/1677; G02F 1/1681;
(Continued)

(56) References Cited

U.S. PATENT DOCUMENTS 6,827,450 B1 * 12/2004 McGettigan ......... H04N 9/3117
359/211.2
2007/0133935 A1 * 6/2007 Fine ........................ G02F 1/011
385/131
(Continued)

FOREIGN PATENT DOCUMENTS

CN 101349853 A 1/2009
CN 105305207 A 2/2016
(Continued)

OTHER PUBLICATIONS

Tawy et al., "Population Lensing in Alexandrite Lasers," IEEE (2019), 1 page.
(Continued)

*Primary Examiner* — Wyatt A Stoffa
*Assistant Examiner* — Grant A Gagnon
(74) *Attorney, Agent, or Firm* — Finnegan, Henderson, Farabow, Garrett & Dunner, LLP (57) ABSTRACT

According to one example, an optical element assembly includes a transparent rod, a mirror and a light emitting element. The rod transmits light of first wavelength region made incident on a first end of the rod and emits the light of the first wavelength region from a second end of the rod. The rod absorbs light of a second wavelength region falling out of the first wavelength region. The mirror is disposed on a side of the first end. The mirror transmits one of the light of the first and second wavelength regions, reflects the other. The light of the first and second wavelength regions are made incident on the first end of the rod. The light emitting element emits light of the second wavelength region made incident on the first end of the rod through the mirror.

13 Claims, 8 Drawing Sheets

(58) Field of Classification Search
CPC ............ G02F 2203/12; G02F 1/16757; G02F 2202/32; G02F 1/0147; G02F 1/155; G02F 1/33; G02F 1/1676; G02F 1/1679; G02F 2203/24; G02F 1/09; G02F 1/153; G02F 1/133603; G02F 1/31; G02F 1/21; G02F 2203/02; G02F 1/133553; G02F 1/1524; G02F 1/291; G02F 2201/16; G02F 2202/28; G02F 1/0128; G02F 1/0136; G02F 1/216; G02F 2203/03; G02F 1/133305; G02F 1/13338; G02F 1/133514; G02F 1/13725; G02F 2201/34; G02F 2201/44; G02F 1/13; G02F 1/133308; G02F 1/1347; G02F 1/157; G02F 1/172; G02F 1/212; G02F 1/293; G02F 2201/305; G02F 2202/36; G02F 2203/34; G02F 1/1333; G02F 1/134309; G02F 1/163; G02F 1/213; G02F 1/294; G02F 2203/10; G02F 2203/50; G02F 1/0102; G02F 1/0121; G02F 1/133331; G02F 1/1334; G02F 1/133524; G02F 1/133526; G02F 1/1685; G02F 1/2955; G02F 1/015; G02F 1/094; G02F 1/1326; G02F 1/13306; G02F 1/1335; G02F 1/133512; G02F 1/1339; G02F 1/13439; G02F 1/1345; G02F 1/1533; G02F 1/19; G02F 1/315; G02F 2202/30; G02F 1/0131; G02F 1/03; G02F 1/11; G02F 1/113; G02F 1/133606; G02F 1/136277; G02F 1/16766; G02F 2201/30; G02F 2202/022; G02F 1/0123; G02F 1/017; G02F 1/025; G02F 1/093; G02F 1/133516; G02F 1/1336; G02F 1/133615; G02F 1/133621; G02F 1/1393; G02F 1/1523; G02F 1/1675; G02F 1/16756; G02F 1/2255; G02F 1/3515; G02F 2203/01; G02F 2203/055; G02F 1/0018; G02F 1/0151; G02F 1/1313; G02F 1/133354; G02F 1/13336; G02F 1/133605; G02F 1/136227; G02F 1/1503; G02F 1/1506; G02F 1/15165; G02F 1/161; G02F 1/16762; G02F 1/195; G02F 1/313; G02F 2201/42; G02F 2201/50; G02F 2203/023; G02F 2203/18; G02F 2203/28; G02F 1/133371; G02F 1/133504; G02F 1/133602; G02F 1/133607; G02F 1/133616; G02F 1/1368; G02F 1/1392; G02F 1/169; G02F 1/225; G02F 1/35; G02F 1/353; G02F 2201/15145; G02F 2201/12; G02F 2201/122; G02F 2201/123; G02F 2201/307; G02F 2201/38; G02F 2201/52; G02F 2202/13; G02F 2203/026; G02F 2203/15; G02F 2203/62; G02F 1/011; G02F 1/0126; G02F 1/01708; G02F 1/0305; G02F 1/061; G02F 1/133348; G02F 1/133377; G02F 1/133622; G02F 1/133626; G02F 1/13452; G02F 1/13454; G02F 1/1362; G02F 1/16753; G02F 1/16761; G02F 1/23; G02F 1/332; G02F 1/335; G02F 2001/1555; G02F 2001/164; G02F 2201/121; G02F 2201/17; G02F 2203/22; G02F 2203/48; G02F 1/0036; G02F 1/0072; G02F 1/01; G02F 1/0157; G02F 1/01791; G02F 1/0316; G02F 1/0322; G02F 1/0356; G02F 1/091; G02F 1/1323; G02F 1/133342; G02F 1/133345; G02F 1/13342; G02F 1/133555; G02F 1/13356; G02F 1/133604; G02F 1/133611; G02F 1/136213; G02F 1/1508; G02F 1/1671; G02F 1/16755; G02F 1/2257; G02F 1/295; G02F 1/3132; G02F 1/3523; G02F 1/3538; G02F 1/39; G02F 2201/56; G02F 2202/12; G02F 2202/20; G02F 2202/40; G02F 2202/42; G02F 2203/07; G02F 2203/09; G02F 2203/30; G02F 2203/60; G02F 1/0054; G02F 1/0107; G02F 1/0327; G02F 1/035; G02F 1/092; G02F 1/095; G02F 1/116; G02F 1/13363; G02F 1/1341; G02F 1/1343; G02F 1/134363; G02F 1/135; G02F 1/136209; G02F 1/1365; G02F 1/1525; G02F 1/1673; G02F 1/311; G02F 1/3558; G02F 1/37; G02F 2/02; G02F 2001/1502; G02F 2001/1536; G02F 2001/1635; G02F 2201/08; G02F 2201/154; G02F 2202/06; G02F 2202/34; G02F 2203/26; G02F 2203/54; G02F 1/0045; G02F 1/0154; G02F 1/01725; G02F 1/01758; G02F 1/0311; G02F 1/0338; G02F 1/07; G02F 1/125; G02F 1/1303; G02F 1/13318; G02F 1/133302; G02F 1/133311; G02F 1/13332; G02F 1/133385; G02F 1/133388; G02F 1/133536; G02F 1/133601; G02F 1/133608; G02F 1/133612; G02F 1/133613; G02F 1/133614; G02F 1/133624; G02F 1/133638; G02F 1/13392; G02F 1/13394; G02F 1/13396; G02F 1/13415; G02F 1/134345; G02F 1/13471; G02F 1/13613; G02F 1/13775; G02F 1/15; G02F 1/165; G02F 1/218; G02F 1/3136; G02F 1/3507; G02F 1/3511; G02F 1/3534; G02F 1/354; G02F 1/3542; G02F 1/361; G02F 2001/1517; G02F 2001/02; G02F 2201/127; G02F 2201/346; G02F 2201/501; G02F 2201/503; G02F 2201/58; G02F 2202/046; G02F 2202/07; G02F 2202/10; G02F 2202/108; G02F 2202/22; G02F 2202/38; G02F 2203/06; G02F 2203/11; G02F 2203/13; G02F 2203/21; G02F 2203/25; G02F 2203/52; G02F 2203/56; G02F 2203/585; G02F 3/00; G02F 1/00; G02F 1/0009; G02F 1/0063; G02F 1/0081; G02F 1/009; G02F 1/0105; G02F 1/0115; G02F 1/0144; G02F 1/0152; G02F 1/0153; G02F 1/0155; G02F 1/0158; G02F 1/01716; G02F 1/01766; G02F 1/01775; G02F 1/0344; G02F 1/05; G02F 1/0508; G02F 1/055; G02F 1/132; G02F 1/133; G02F 1/13312; G02F 1/133314; G02F 1/133357; G02F 1/133365; G02F 1/133368; G02F 1/133374; G02F 1/133382; G02F 1/133509; G02F 1/133519; G02F 1/133533; G02F 1/133541; G02F 1/133545; G02F 1/133548; G02F 1/133562; G02F 1/133565; G02F 1/13362; G02F 1/133628; G02F 1/133631; G02F 1/1337;

G02F 1/133707; G02F 1/133711; G02F
1/133753; G02F 1/133757; G02F
1/133776; G02F 1/134318; G02F
1/134327; G02F 1/134336; G02F
1/13476; G02F 1/136222; G02F
1/136281; G02F 1/13718; G02F 1/13768;
G02F 1/13793; G02F 1/139; G02F
1/1391; G02F 1/1397; G02F 1/141; G02F
1/1418; G02F 1/1516; G02F 1/15245;
G02F 1/215; G02F 1/25; G02F 1/3137;
G02F 1/3501; G02F 1/3517; G02F
1/3536; G02F 1/3544; G02F 1/355; G02F
1/3551; G02F 1/3555; G02F 1/3556;
G02F 1/3611; G02F 1/3612; G02F
1/3613; G02F 1/3615; G02F 1/365; G02F
1/3775; G02F 2001/15757; G02F
2201/05; G02F 2201/063; G02F
2201/343; G02F 2201/508; G02F
2201/54; G02F 2202/02; G02F 2202/025;
G02F 2202/027; G02F 2202/04; G02F
2202/101; G02F 2202/104; G02F
2202/105; G02F 2202/107; G02F
2202/16; G02F 2203/17; G02F 2203/66;
G02F 2413/02; G02F 3/02; G02F 3/024;
G02F 7/00

USPC .......................................................... 359/298
See application file for complete search history.

(56) References Cited

U.S. PATENT DOCUMENTS

2018/0195694 A1\* 7/2018 Jutte .................. G02B 27/0927
2020/0265568 A1 8/2020 Kobayashi et al.

FOREIGN PATENT DOCUMENTS

| JP | H11-194373 A | 7/1999 |
| JP | 2006-47484 A | 2/2006 |
| JP | 2007-225825 A | 9/2007 |
| JP | 2009-175164 A | 8/2009 |
| JP | 2009-276530 A | 11/2009 |
| JP | 2011-17863 A | 1/2011 |
| JP | 5261646 B2 | 8/2013 |
| WO | WO 2019/054887 A2 | 3/2019 |

OTHER PUBLICATIONS

Poulton et al., "Coherent Solid-state LIDAR with silicon photonic optical phased arrays," Optics Letters, vol. 42, No. 20, pp. 4091-4094 (Oct. 5, 2017).

\* cited by examiner

OPTICAL ELEMENT ASSEMBLY, OPTICAL IMAGING DEVICE, AND OPTICAL PROCESSING DEVICE

CROSS REFERENCE TO RELATED APPLICATION

This application is based upon and claims the benefit of priority from prior Japanese Patent Application No. 2019-168955, filed Sep. 18, 2019, the entire contents of which are incorporated herein by reference.

FIELD

Embodiments described herein relate generally to an optical element assembly, an optical imaging device, and an optical processing device.

BACKGROUND

Focal length is generally adjusted by mechanically changing the position of the lens assembly including a plurality of lenses.

DETAILED DESCRIPTION OF THE INVENTION

The following is an explanation of an optical element assembly 12 with reference to drawings. The drawings are schematic or conceptual ones.

The problem to be solved by the present embodiment is to provide an optical element assembly, an optical imaging device, and an optical processing device capable of adjusting a focal position at higher speed.

According to one embodiment, an optical element assembly includes: a transparent rod, a mirror, and a light emitting element. The transparent rod includes a first end and a second end. The transparent rod is configured to transmit light of first wavelength region made incident on the first end and emit the light of the first wavelength region from the second end. The transparent rod is configured to absorb light of a second wavelength region falling out of the first wavelength region. The mirror is disposed on a side of the first end of the rod. The mirror is configured to transmit one of the light of the first wavelength region and the light of the second wavelength region, reflect the other. The light of the first wavelength region and the light of the second wavelength region are made incident on the first end of the rod. The light emitting element is configured to emit light of the second wavelength region. The light of the second wavelength region is made incident on the first end of the rod through the mirror.

First Embodiment

Figure 1:
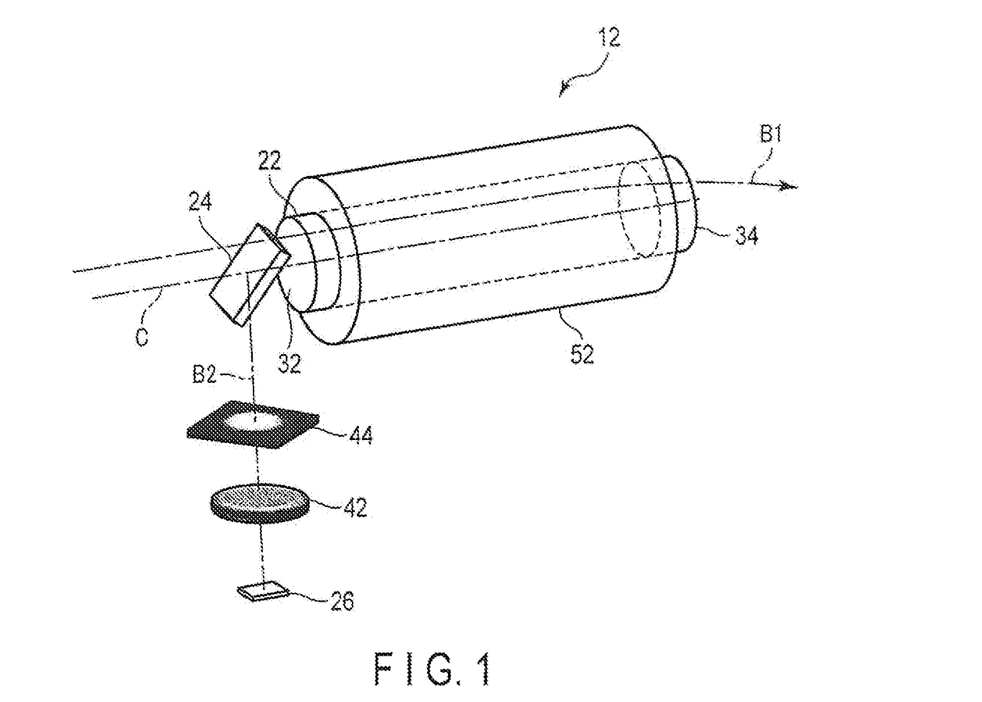
FIG. 1 is a schematic perspective view illustrating an optical element assembly according to a first embodiment.
Figure 2:
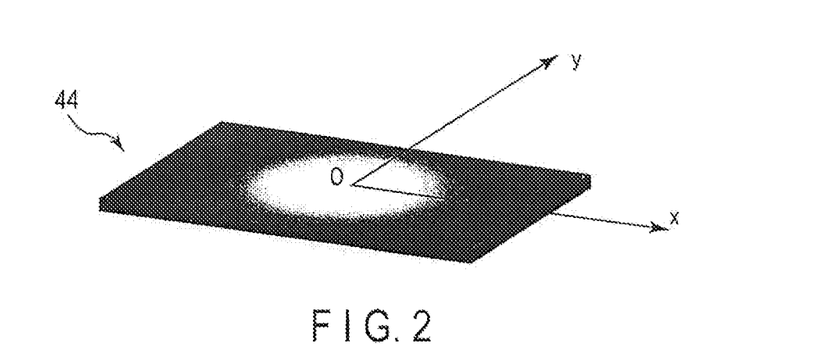
FIG. 2 is a schematic perspective view illustrating a light beam intensity adjusting element in FIG. 1.
Figure 3:
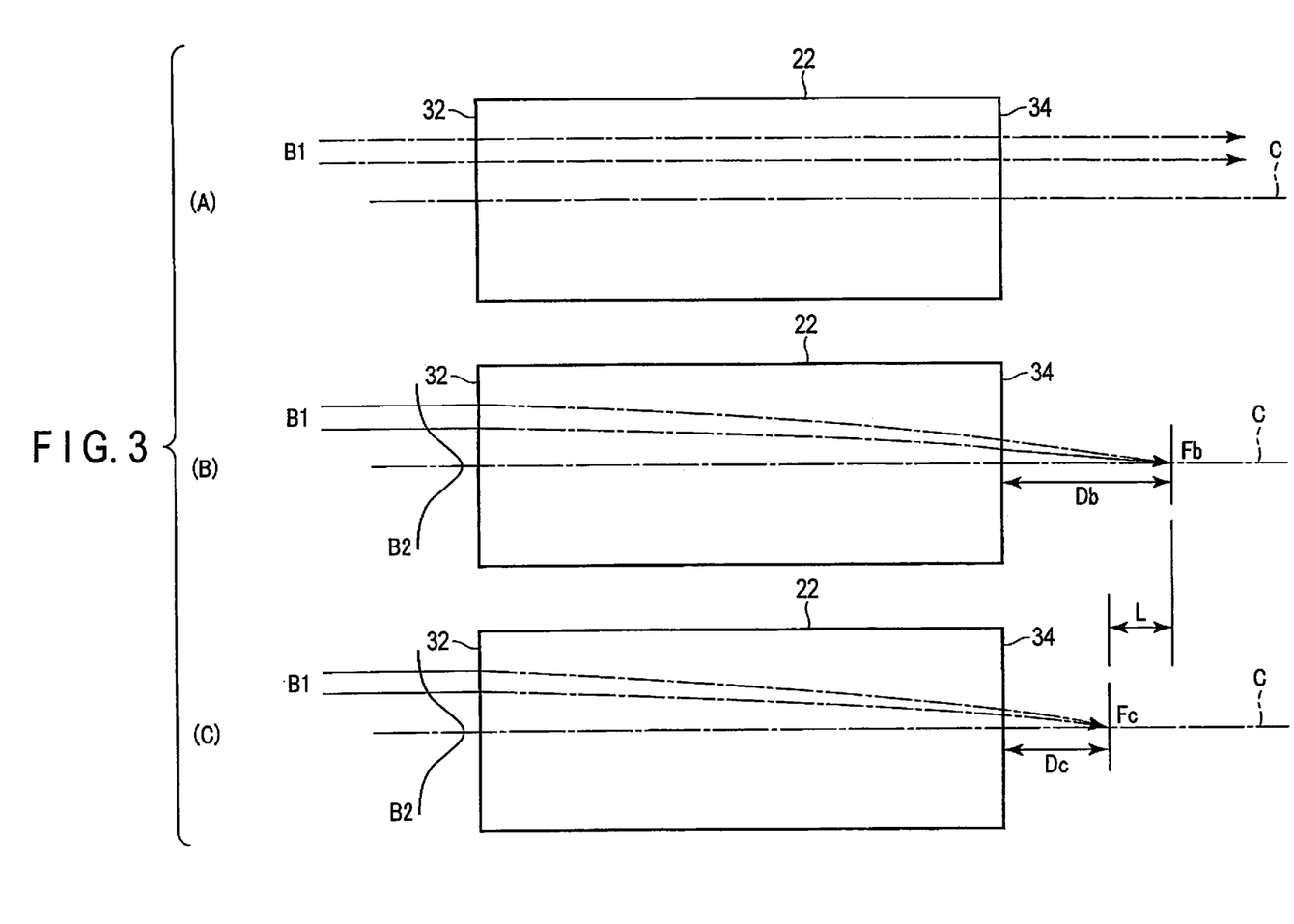
FIG. 3 is a schematic diagram illustrating that a focal position of a first light beam is variable when the optical element assembly according to the first embodiment is used.

The following is an explanation of the first embodiment with reference to FIG. 1 to FIG. 3.

As illustrated in FIG. 1, the optical element assembly 12 according to the present embodiment includes a rod 22, a mirror 24, and a light emitting element 26.

The rod 22 is formed of a transparent material and in a columnar shape having a first end 32 and a second end 34. The shape of the rod 22 is not limited to the columnar shape. The rod 22 is formed symmetrically with respect to the central axis C. The first end 32 and the second end 34 are formed as surfaces orthogonal to the central axis C.

The rod 22 has a diameter of several millimeters to tens of millimeters. The rod 22 has a length of several millimeters to tens of millimeters. The shape and/or the size of the rod 22 can be properly set.

The rod 22 transmits light of first wavelength region and absorbs light of second wavelength region. As a material of the rod 22, for example, a glass material having infrared absorbency is used. A proper material is selected as the material of the rod 22 depending on the selection of a light beam B1 of the first wavelength region that the user wants to transmit through the rod 22, and the selection of a light beam B2 of the second wavelength region that the user wants to absorb with the rod 22.

In the present embodiment, the wavelength of the first wavelength region is shorter than the wavelength of the second wavelength region. The first wavelength region is, for example, 550 nm falling within wavelength range (380 nm to 780 nm) of visible light. The second wavelength region is, for example, 850 nm falling within wavelength range (800 nm to 1 mm) of infrared rays. The first wavelength region and the second wavelength region are mere examples, and can be properly set. For this reason, the rod 22 has infrared absorbency. In some wavelengths to be used, the wavelength of the first wavelength region is longer than the wavelength of the second wavelength region.

Because the rod 22 is symmetrical with respect to the central axis C, heat is uniformly radiated outward in the radial direction from the central axis C of the rod 22.

The mirror 24 is disposed on a side of the first end 32 of the rod 22. The mirror 24 crosses the central axis C. The mirror 24 is inclined by, for example, 45° with respect to the central axis C of the rod 22.

In the present embodiment, the mirror 24 transmits first light beam B1 including the first wavelength region, such as visible light, and reflects second light beam B2 including the second wavelength region, such as infrared rays. For example, the mirror 24 is a dichroic mirror. The mirror 24 may be a cube-type dichroic mirror 124 illustrated in FIG. 7.

The light emitting element 26 is capable of emitting the second light beam B2 of the second wavelength region. The light emitting element 26 is capable of switching ON/OFF states. The light emitting element 26 emits light in the ON state, and applies the light to the mirror 24.

As the light emitting element 26, for example, a LED or a laser diode (LD) is used. When a laser diode is used as the light emitting element 26, the light beam thereof approximates to a Gaussian beam. For this reason, when a laser diode is used as the light emitting element 26, a lens 42 and a light beam intensity adjusting element 44 can be omitted.

A lens 42 is preferably disposed between the infrared light emitting element 26 and the mirror 24. The lens 42 shapes, for example, the light beam from the light emitting element 26 into parallel light or the like.

A light beam intensity adjusting element 44 is preferably disposed between the lens 42 and the mirror 24. The light beam intensity adjusting element 44 adjusts the beam profile of the second light beam B2 from the light emitting element 26. As illustrated in FIG. 2, the light beam intensity adjusting element 44 provides the transmittance of the second light beam B2 with distribution. The distribution has circular polar coordinates (r, θ) with respect to the X-Y coordinates. The second light beam B2 emitted from the light emitting element 26 has an axial-symmetrical beam profile directly after passing through the light beam intensity adjusting element 44.

In this state, when the intensity of a cross section of the light beam is I, the beam profile is expressed as follows, as a function of r.

$$I=f(r) \tag{1}$$

Expression (1) is based on the supposition that an axial-symmetrical beam, such as a Gaussian beam, is made incident on the mirror 24 as the second light beam B2, but a beam that is not axial-symmetrical may be made incident on the mirror 24.

A tubular heat radiator 52 is provided around the external circumference of the rod 22. The heat radiator 52 has a cylindrical body. A wall portion of the heat radiator 52 is preferably solid. The whole length of the heat radiator 52 is substantially the same as the whole length of the rod 22. The heat radiator 52 is formed of a material having higher heat conductivity than that of the rod 22. The heat radiator 52 is preferably formed of a metal material with good heat conductivity, such as copper and aluminum alloy.

The heat radiator 52 is formed of the material with good heat conductivity and in the cylindrical body. In addition, a Peltier element used for various types of cooling devices may be used instead of the cylindrical body.

The following is an explanation of operations of the optical element assembly 12 according to the present embodiment.

When the light emitting element 26 emits light, the second light beam B2 emitted from the light emitting element 26 becomes parallel light through the lens 42. The parallel light passes through the light beam intensity adjusting element 44. The second light beam B2 transmitted through the light beam intensity adjusting element 44 has a beam profile based on Expression (1). An example of the beam profile based on Expression (1) is a Gaussian beam.

The second light beam B2 adjusted to have a beam profile based on Expression (1) is reflected with the mirror 24. The second light beam B2 adjusted to have a beam profile based on Expression (1) is made incident on the first end 32 of the rod 22. In this state, the mirror 24 is in an adjusted position such that the second light beam B2 adjusted to be axial-symmetrical is made incident on a position in which the central axis of the second light beam B2 agrees with, or substantially agrees with, the central axis C of the rod 22.

The rod 22 absorbs light of the second wavelength region of the second light beam B2 at proper rate, between the first end 32 and the second end 34. The temperature of the rod 22 increases when the second light beam B2 is made incident thereon and the rod 22 absorbs the second light beam B2. The rod 22 generates refractive index distribution in accordance with temperature increase. Specifically, the refractive index of the rod 22 changes when the second light beam B2 is made incident thereon and the rod 22 absorbs the second light beam B2.

In this state, the central axis of the axial-symmetrical second light beam B2 agrees with, or substantially agrees with, the central axis C of the rod 22. For this reason, the refractive index of the rod 22 changes outward in the radial direction from the central axis C. When the temperature increase ΔT in a proper position of the rod 22 is sufficiently small, such as ten to twenty, the refractive index distribution of the rod 22 linearly changes. The refractive index distribution of the rod 22 has a profile similar to Expression (1). When n0 is the refractive index of the rod 22 when the temperature distribution between the central axis C and the external circumferential surface of the rod 22 is fixed, that is, when the rod 22 has no temperature gradient, the change quantity Δn of the refractive index of the rod 22 after temperature increase is as follows.

$$\Delta n = \alpha \Delta T \tag{2}$$

The mirror 24 transmits the first light beam B1 from a region opposed to the first end 32 of the rod 22, and the first light beam B1 is made incident on the first end 32 of the rod 22. In this operation, the following light beam equation can be used.

$$\frac{d}{ds}\left(n\frac{dq}{ds}\right) = \nabla n \tag{3}$$

Using the equation (3) described above enables calculation of a locus of the first light beam (visible light) B1 from the region opposed to the first end 32 of the rod 22.

As described above, by making the second light beam B2 of the second wavelength region incident on the rod 22 and causing temperature change in the rod 22, the refractive index of the rod 22 can be changed toward the outside in the radial direction with respect to the central axis C of the rod 22. For this reason, the first light beam B1 opposed to the first end 32 of the rod 22, transmitted through the mirror 24, and passing between the first end 32 and the second end 34 of the rod 22 is curved (deflected) in accordance with the refractive index. Accordingly, when the second light beam B2 of the second wavelength region is made incident on the rod 22 and temperature change is caused in the rod 22, the rod 22 can be used as a lens.

Part (A) to Part (C) in FIG. 3 illustrate states in which the refractive index of the rod 22 changes without mechanically moving the rod 22, the mirror 24, the light emitting element 26, the lens 42, or the light beam intensity adjusting element 44.

Part (A) in FIG. 3 illustrates a state in which no second light beam B2 is made incident on the rod 22 from the light emitting element 26, and no temperature distribution occurs in the rod 22 outward in the radial direction from the central axis C. In this case, the rod 22 does not function as a lens, and the first light beam B1 passing through the rod 22 is not focused, or focused at infinity. As described above, when the temperature distribution of the rod 22 is fixed in the radial direction from the central axis C, the refractive index of the rod 22 is fixed.

Part (B) in FIG. 3 illustrates a state in which the second light beam B2 is made incident on the first end 32 of the rod 22 from the light emitting element 26, and temperature distribution is generated in the rod 22 outward in the radial direction from the central axis C. For example, by emission of the second light beam B2 from the light emitting element 26, the refractive index of the rod 22 is instantly changed, and the locus of the first light beam B1 is instantly changed. In this case, the temperature is highest at the central axis C of the rod 22, and the temperature decreases toward the outside in the radial direction from the central axis C. When the temperature distribution of the rod 22 changes, the refractive index of the rod 22 changes in accordance with the temperature distribution. In this state, the refractive index in the position along the central axis C is larger than the refractive index in an outside position in the radial direction with respect to the central axis C. The rod 22 in this state becomes equal to, for example, a GRIN lens. Light has a property of being deflected toward a direction with higher refractive index. For this reason, the first light beam B1 from the region opposed to the first end 32 of the rod 22 is focused, for example, in a position Fb at a proper distance Db from the second end 34 of the rod 22.

Part (C) in FIG. 3 illustrates a state in which the second light beam B2 is made incident on the first end 32 of the rod 22 from the light emitting element 26, and temperature distribution is generated in the rod 22 outward in the radial direction from the central axis C. In this case, the temperature decreases toward the outside in the radial direction from the central axis C of the rod 22. In addition, the example illustrated in part (C) in FIG. 3 has a higher temperature gradient toward the outside in the radial direction from the central axis C than that in the example illustrated in part (B) in FIG. 3. In this state, the first light beam B1 from the region opposed to the first end 32 of the rod 22 is focused in a position Fc at a proper distance Dc from the second end 34 of the rod 22. The position Fc is closer to the second end 34 of the rod 22 than the position illustrated in part (B) of FIG. 3 is.

As described above, the focal position Fb of the example illustrated in part (B) of FIG. 3 is longer than the focal position Fc of the example illustrated in part (C) of FIG. 3 by a length L (=distance Db−distance Dc). In this case, the example illustrated in part (C) in FIG. 3 enables observation of the subject in a position closer to the first end 32 of the rod 22 than that in the example illustrated in part (B) in FIG. 3.

In the present embodiment, the heat radiator 52 is disposed around the external circumference of the rod 22. When the rod 22 absorbs the second light beam B2, the heat radiator 52 absorbs heat in the rod 22, and radiates the heat outward in the radial direction. As the heat radiation quantity with the heat radiator 52 increases, temperature change (temperature gradient) between the central axis C of the rod 22 and the external circumferential surface of the rod 22 increases by adjustment of the light quantity (light beam intensity) of the second light beam with respect to the rod 22.

In the state where the second light beam B2 is made incident on the first end 32 of the rod 22 from the light emitting element 26, the heat radiator 52 adjusts the temperature gradient ranging from the central axis C of the rod 22 toward the outside in the radial direction. With this structure, the heat radiator 52 enables easy control of the refractive index of the rod 22 when the second light beam 22 is absorbed into the rod 22.

The optical element assembly 12 is capable of changing the focal position F along the central axis C. With this structure, the optical element assembly 12 according to the present embodiment enables transmission of a signal, for example, to a distant place at high speed. In addition, this structure enables change of the refractive index of the rod 22 at high speed without requiring any mechanical element components, such as a galvanometer mirror. Accordingly, this structure enables change of the light beam direction of the first light beam B1 by making the second light beam B2 of the second wavelength region incident on the central axis C of the rod 22 from the light emitting element 26.

With the structure described above, the image formation optical system of the optical element assembly 12 according to the present embodiment is capable of changing the focus position seamlessly at high speed. Accordingly, the present embodiment provides an optical element assembly capable of adjusting the focal position at higher speed.

The present embodiment illustrates the example of forming the rod 22 in a circular columnar shape. The rod 22 may be pillars of various shapes, such as an elliptic columnar shape and a rectangular prism shape. In the case of using a rod 22 having no circular columnar shape, such as a rod 22 of a rectangular prism shape, the temperature distribution around the external circumference of the rod 22 may become non-uniform with respect to the central axis C. In this case, the refractive index can be adjusted by adjusting the heat radiator 52 to make the temperature distribution with respect to the central axis C uniform.

Second Embodiment

A second embodiment will now be explained with reference to FIG. 4. The present embodiment is a modification of the first embodiment, the members explained in the first embodiment or members having the same functions as those of the members explained I the first embodiment are denoted with the same reference numerals as much as possible, and a detailed explanation thereof is omitted.

Figure 4:
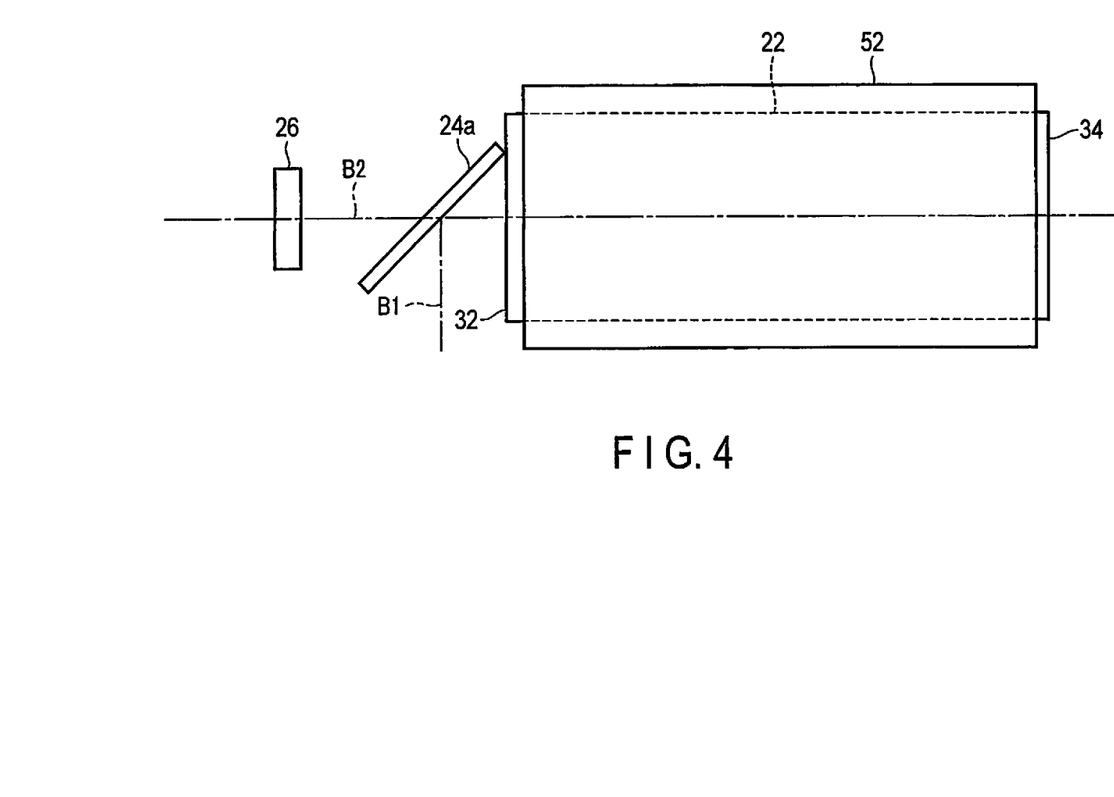
FIG. 4 is a schematic perspective view illustrating an optical element assembly according to a second embodiment.

As illustrated in FIG. 4, an optical element assembly 12 according to the present embodiment includes a rod 22, a mirror 24a, and a light emitting element 26. The lens 42 and the light beam intensity adjusting element 44 are omitted herein, but the lens 42 and the light beam intensity adjusting element 44 may be arranged between the light emitting element 26 and the mirror 24a.

The mirror 24a is disposed on a side of the first end 32 of the rod 22. The mirror 24a crosses the central axis C. The mirror 24a is disposed in a state of 45° with respect to the first end 32 of the rod 22. The mirror 24a reflects light of the first wavelength region and transmits light of the second wavelength region, unlike the mirror 24 explained in the first embodiment.

The light emitting element 26 emits light of the second wavelength region. The light emitting element 26 is disposed in a position, for example, opposed to the first end 32. The light emitted from the light emitting element 26 is emitted toward the mirror 24a.

Disposition of the mirror 24a with respect to the rod 22 can be properly set. When the mirror 24a is rotated around the central axis C while the mirror 24a maintains the state of 45° with respect to the first end 32, an image of a region of 360° in a direction orthogonal to the central axis C is emitted from the second end 34 through the first end 32 of the rod 22.

Accordingly, the optical element assembly 12 according to the present embodiment is capable of transmitting an image of a proper position, as well as an image of a position opposed to the first end 32 of the rod 22, through the rod 22 from the second end of the rod 22 to a position opposed to the second end 34 of the rod 22.

As explained above, the optical element assembly 12 according to the first and the second embodiment includes the transparent rod 22, the mirror 24 or 24a, and the light emitting element 26. The rod 22 transmits light of the first wavelength region made incident on the first end 32, emits the light from the second end 34, and absorbs light of the second wavelength region falling out of the first wavelength region. The mirror 24 or 24a is disposed on a side of the first end 32 of the rod 22, transmits one of the light of the first wavelength region and the light of the second wavelength region, reflects the other. The light of the first wavelength region and the second wavelength region is made incident on the first end 32 of the rod 22. The light emitting element 26 emits light of the second wavelength region. The light of the second wavelength region is made incident on the first end 32 of the rod 22 through the mirror 24 or 24a.

The first and the second embodiments provide the optical element assembly 12 capable of adjusting the focal position at higher speed.

First Example

Figure 5:
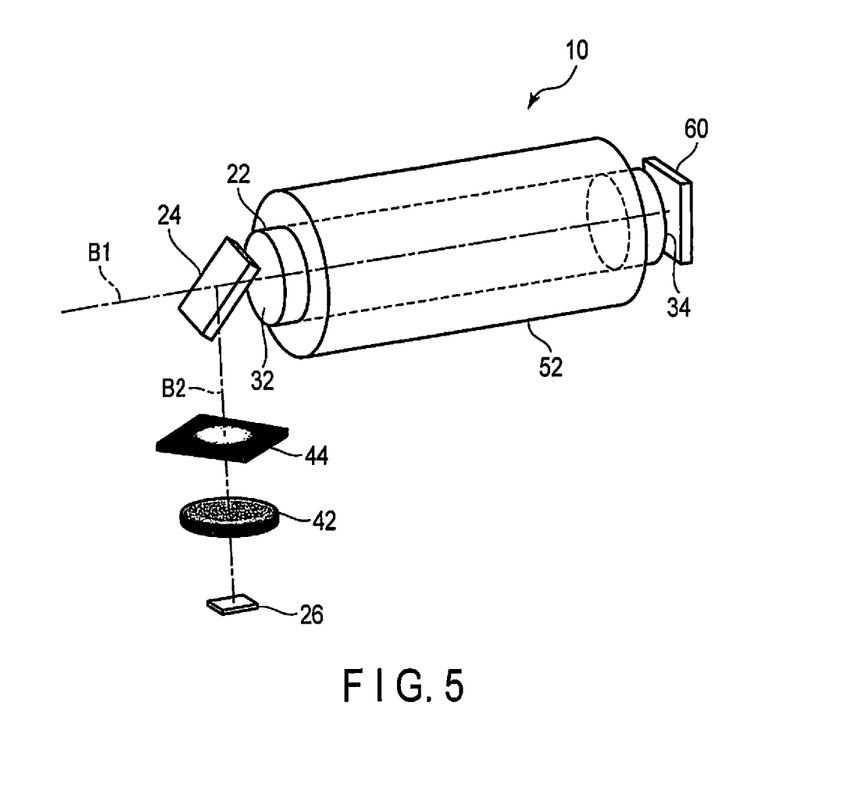
FIG. 5 is a schematic perspective view illustrating an optical imaging device according to a first example.

The following is an explanation of an optical imaging device 10 including the optical element assembly 12 according to the first embodiment and the second embodiment with reference to FIG. 5. The explanation will be made using the optical element assembly 12 explained in the first embodiment, but the optical element assembly 12 explained in the second embodiment may be used.

As illustrated in FIG. 5, the optical imaging device 10 according to the present example includes the optical element assembly 12 and an image sensor 60.

The image sensor 60 is disposed on a side of the second end 34 of the rod 22. The image sensor 60 is capable of imaging an image transmitted through the mirror 24 and the rod 22 along the central axis C of the rod 22.

In the present example, the change quantity Δn of the refractive index of the rod after temperature increase is set to satisfy, for example, $$n+\Delta n=n_c(1-\beta r^2) \quad (4)$$

According to the present example, an image formation imaging optical system (optical imaging device 10) is acquired by combining the optical element assembly 12 with the image sensor 60.

The focus position of a first light beam B1 of the first wavelength region with the rod 22 can be set variable by changing the intensity of a second light beam B2 of the second wavelength region made incident on the first end 32 of the rod 22 from the light emitting element 26, or adjusting the heat radiator 52 to generate temperature distribution.

The refractive index of the optical element assembly 12 increases by increasing the gradient of the refractive index from the central axis C toward the outside in the radial direction, and the refractive index decreases by decreasing the gradient of the refractive index.

As described above, the example (C) in FIG. 3 enables observation of the subject in the position closer to the first end 32 of the rod 22 than that in the example (B) in FIG. 3. The optical element assembly 12 enables acquisition of an image of a desired distance from the first end 32 of the rod 22, from a position close to the first end 32 of the rod 22 to a distant position (infinity), without mechanically moving the rod 22. Specifically, the optical imaging device 10 according to the present embodiment enables acquisition of an image of a wide focal length, such as close-up photography and distant-view photography, by adjustment at higher speed without mechanical mechanism.

Second Example

Figure 6:
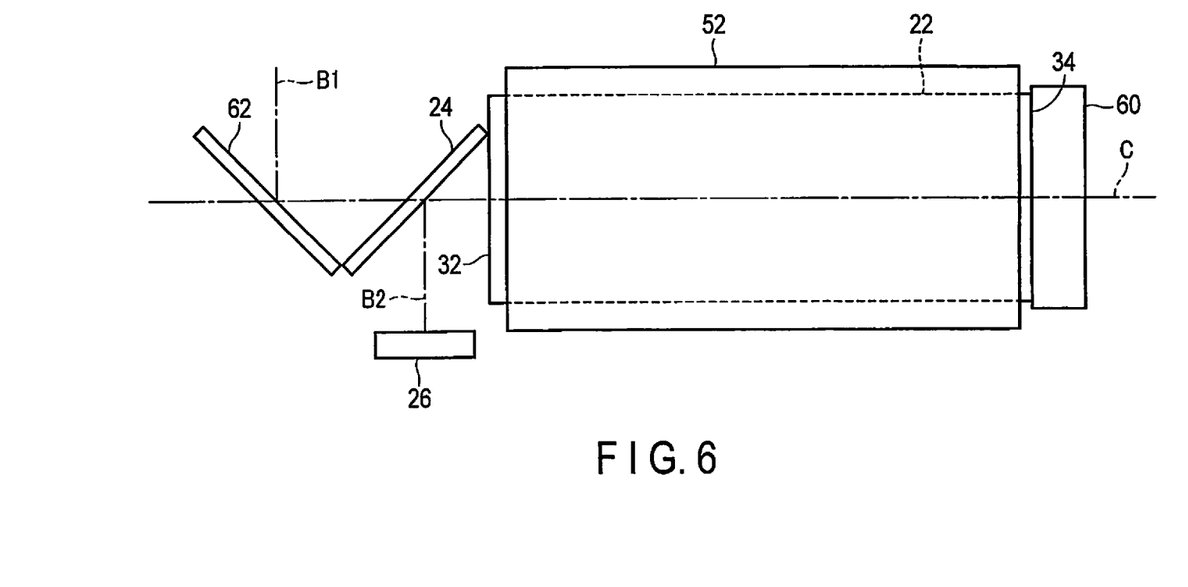
FIG. 6 is a schematic diagram illustrating an optical imaging device according to a second example.

The following is an explanation of the optical imaging device 10 including the optical element assembly 12 according to the first embodiment with reference to FIG. 6. The present example is a modification of the first example.

As illustrated in FIG. 6, the mirror 24 is disposed in a position opposed to the first end 32 of the rod 22. In addition, a mirror 62 is disposed on the central axis C of the rod 22. The mirror 24 is positioned between the mirror 62 and the first end 32 of the rod 22.

The mirror 62 reflects the light of the first wavelength region, and the reflected light is made incident on the first end 32 of the rod 22 through the mirror 24.

With this structure, the imaging device 10 is capable of imaging an image of a proper position, as well as an image on the central axis C, with the image sensor 60.

Third Example

Figure 7:
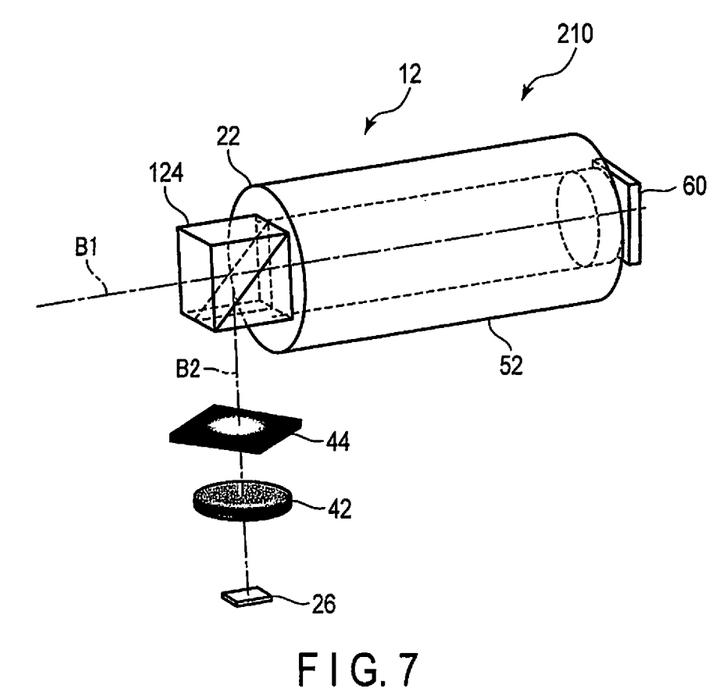
FIG. 7 is a schematic perspective view illustrating an optical imaging device according to a third example.

The following is an explanation of an optical imaging device 10 including the optical element assembly 12 according to the first embodiment and the second embodiment with reference to FIG. 7. The explanation will be made using the optical element assembly 12 explained in the first embodiment, but the optical element assembly 12 explained in the second embodiment may be used.

As illustrated in FIG. 7, a mirror cube 124 is used instead of the mirror 24. The mirror cube 124 is a type of the mirror 24.

The mirror cube 124 can be directly attached to the first end 32 of the rod 22. The mirror cube 124 is hard to be affected by air pressure and/or water pressure. For this reason, the mirror cube 24 has higher adaptability to environments. For this reason, the optical element assembly 12 and the imaging device 10 including the optical element assembly 12 according to the present example can be used even in the water and/or the space.

The image sensor 60 can also be directly attached to the second end 34 of the rod 22. Accordingly, the optical element assembly 12 according to the present modification enables achievement of an all-solid lens. the optical element assembly 12 according to the present example is solid and robust against oscillation.

Fourth Example

The following is an explanation of an optical processing device 210 including the optical element assembly 12 according to the first embodiment and the second embodiment described above with reference to FIG. 8 and FIG. 9. The explanation will be made using the optical element assembly 12 explained in the first embodiment, but the optical element assembly 12 explained in the second embodiment may be used.

Figure 8:
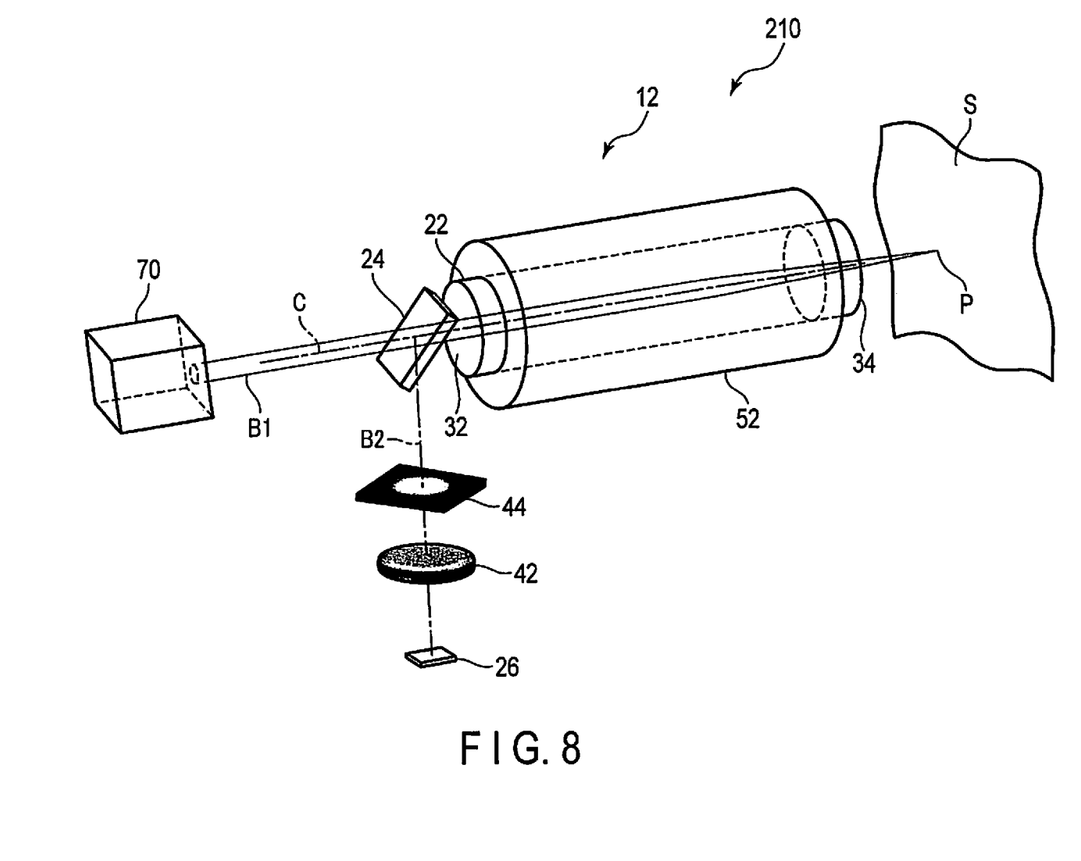
FIG. 8 is a schematic perspective view illustrating an optical processing device according to a fourth example.

As illustrated in FIG. 8, the optical processing device 210 according to the present example includes the optical element assembly 12 and a laser light source (light emitter of the first wavelength region) 70 to emit the light of the first wavelength region.

The laser light source 70 emits laser light having proper power density enabling laser processing, as the light of the first wavelength region. The laser light source 70 is configured to enter the laser light to the first end 32 of the rod 22 via the mirror 24, and emit the laser light from the second end 34 of the rod 22.

Proper laser is used as the laser light source 70. Examples of the proper laser include UV laser (excimer laser), green laser, CO2 laser, YAG laser, YVO laser, and fiber laser.

As an example, the wavelength region of infrared light is 800 nm to 1000 μm (1 mm). In the wavelength region, the wavelength region of near-infrared light is 800 nm to 2.5 μm, as an example. The wavelength region of the middle infrared light is 2.5 μm to 4 μm, for example. The wavelength region of the far infrared light is 4 μm to 1000 μm (1 mm), for example.

The wavelength of the UV laser is, for example, 355 μm. The wavelength of the green laser is, for example, 532 μm. For this reason, the wavelength regions of the UV laser and the green laser fall out of the wavelength region of the infrared light.

The wavelength of the CO2 laser is, for example, 10600 μm. The wavelength of the YAG laser and the YVO laser is, for example, 1064 nm. The wavelength of the fiber laser is, for example, 1090 μm. For this reason, the wavelength regions of the CO2 laser, the YAG laser, the YVO laser, and the fiber laser fall within the wavelength region of the infrared light.

The mirror 24 can be set to transmit the light (laser light) of the first wavelength region and reflect the light of the second wavelength region, even in the same infrared region (wavelength of 800 nm to 1 mm), by a publicly-known manufacturing technique. For this reason, when laser processing is performed using laser light of the wavelength region of the infrared light, such as CO2 laser, YAG laser, YVO laser, and fiber laser, the mirror 24 according to the present example transmits light (laser light) of the first wavelength region and reflects light of the second wavelength region in the infrared region.

The rod 22 is formed of a material transmitting laser of a proper wavelength region in the infrared region, such as CO2 laser, YAG laser, YVO laser, and fiber laser, without absorbing the laser. When the second wavelength region is, for example, 850 nm (near infrared region) as described above, the first wavelength region of the infrared region is, for example, 1064 nm to 10600 nm, and sufficiently longer than the second wavelength region. The second wavelength region is preferably a wavelength region falling widely out of the first wavelength region. For this reason, for example, a glass material having absorbency of infrared rays having a wavelength, such as 10600 nm, is used as the material of the rod 22. By contrast, for example, a glass material transmitting infrared rays having a wavelength, such as 850 nm, is used as the material of the rod 22 according to the present example.

As described above, the material of the rod 22 is selected according to selection of the light beam B2 of the second wavelength region to be absorbed and the light beam B1 of the first wavelength region to be transmitted.

Figure 9:
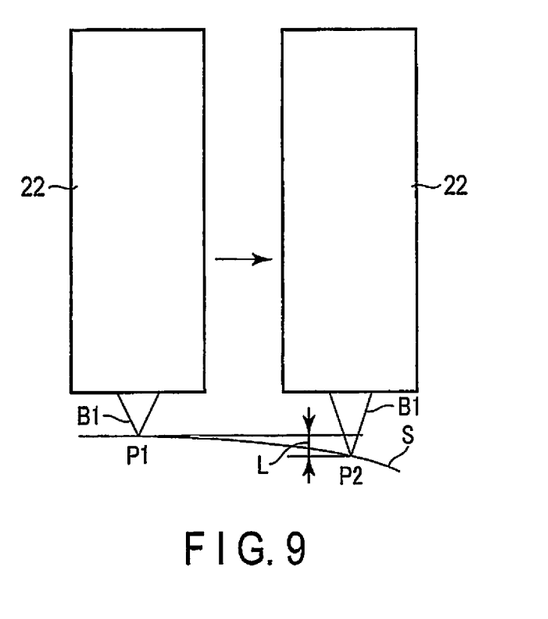
FIG. 9 is a schematic diagram illustrating that a processing position of a processing surface of a first light beam emitted from a rod of the optical processing device illustrated in FIG. 8 is variable.

As illustrated in FIG. 9, the focal position of the light of the first wavelength region can be adjusted by adjusting the refractive index on the basis of the temperature distribution extending toward the outside in the radial direction from the central axis C of the rod 22 with the light of the second wavelength region. For this reason, the processing point P (see FIG. 8) of laser processing is moved forward and backward along the central axis C by adjusting the refractive index of the rod 22. Accordingly, the optical processing device 210 is capable of adjusting the focal position, for example, from a focal position P1 to a focal position P2 serving as a distant focal position, without mechanically moving the lens or the like. In addition, the optical processing device 210 is capable of adjusting the focal position from the distant focal position P2 to the close focal position P1. This structure enables easy execution of laser processing on, for example, a surface S having projections and depressions.

The present example enables achievement of the laser processing device (optical processing device) 210 capable of instantly adjusting the position of the processing point.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical element assembly comprising:
   a rod including a first end and a second end, wherein the rod is transparent for light of a first wavelength region, the rod being configured to transmit the light of the first wavelength region made incident on the first end and emit the light of the first wavelength region from the second end, and being configured to radially change a refractive index by absorbing light of a second wavelength region made incident on the first end, the second wavelength region falling out of the first wavelength region;
   a mirror disposed on a side of the first end of the rod, the mirror being configured to transmit one of the light of the first wavelength region and the light of the second wavelength region and reflect the other so that the light of the first wavelength region and the light of the second wavelength region are made incident on the first end of the rod; and
   a light emitting element configured to emit the light of the second wavelength region so that the light of the second wavelength region is made incident on the first end of the rod through the mirror,
   wherein a focus of the light of the first wavelength region passing through the rod is controllable by the light of the second wavelength region.

2. The optical element assembly according to claim 1, wherein the rod has a cylindrical shape.

3. The optical element assembly according to claim 1, wherein
   the first wavelength region includes a wavelength region of visible light, and
   the second wavelength region includes a wavelength region of infrared rays.

4. The optical element assembly according to claim 1, comprising:
   a tubular heat radiator provided around an external circumference of the rod.

5. The optical element assembly according to claim 1, wherein the mirror includes a cube-shaped dichroic mirror.

6. The optical element assembly according to claim 1, comprising:
- a lens between the light emitting element and the mirror and configured to shape the light emitted from the light emitting element.

7. The optical element assembly according to claim 1, comprising:
- an adjustment element between the light emitting element and the mirror and configured to adjust intensity of the light made incident on the first end of the rod from the light emitting element through the mirror.

8. An optical imaging device comprising:
- the optical element assembly according to claim 1; and
- an image sensor disposed in a position opposed to the second end of the rod and configured to image the light of the first wavelength region.

9. The optical imaging device according to claim 8, wherein wavelength of the first wavelength region is shorter than wavelength of the second wavelength region.

10. An optical processing device comprising:
- the optical element assembly according to claim 1; and
- a light emitter configured to emit the light of the first wavelength region and configured to enter the light to the first end of the rod via the mirror, and emit the light from the second end of the rod.

11. The optical processing device according to claim 10, wherein
- the second wavelength region includes a wavelength region of infrared rays, and
- the light of the first wavelength region includes laser light of wavelength region different from the infrared rays.

12. The optical processing device according to claim 10, wherein
- the second wavelength region includes wavelength region of infrared rays, and
- the light of the first wavelength region includes infrared rays of wavelength region different from the infrared rays of the second wavelength region.

13. The optical element assembly according to claim 1, wherein the refractive index of the rod is larger in a portion along a central axis than in a radially outside portion when the rod absorbs the light of the second wavelength region made incident on the first end along the central axis.

* * * * *